(12) United States Patent
Wei et al.

(10) Patent No.: US 11,322,111 B2
(45) Date of Patent: May 3, 2022

(54) DRIVING METHOD OF DISPLAY DEVICE AND DISPLAY DEVICE

(71) Applicants: Hefei Xinsheng Optoelectronics Technology Co., Ltd., Hefei (CN); BOE TECHNOLOGY GROUP CO., LTD., Beijing (CN)

(72) Inventors: Xueqin Wei, Beijing (CN); Chunyang Nie, Beijing (CN); Ke Dai, Beijing (CN); Ruilian Li, Beijing (CN); Lixin Zhu, Beijing (CN); Bingbing Yan, Beijing (CN); Yan Yang, Beijing (CN); Wen Chieh Huang, Beijing (CN); Ching Hua Hung, Beijing (CN); Wei Sun, Beijing (CN); Rui Liu, Beijing (CN); Ming Chen, Beijing (CN)

(73) Assignees: Hefei Xinsheng Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 79 days.

(21) Appl. No.: 16/767,000

(22) PCT Filed: Dec. 4, 2019

(86) PCT No.: PCT/CN2019/123036
§ 371 (c)(1),
(2) Date: May 26, 2020

(87) PCT Pub. No.: WO2020/151375
PCT Pub. Date: Jul. 30, 2020

(65) Prior Publication Data
US 2021/0201838 A1 Jul. 1, 2021

(30) Foreign Application Priority Data
Jan. 25, 2019 (CN) .......................... 201910074232.4

(51) Int. Cl.
*G09G 3/36* (2006.01)
*G02F 1/1362* (2006.01)

(52) U.S. Cl.
CPC ..... *G09G 3/3688* (2013.01); *G02F 1/136286* (2013.01); *G09G 3/3677* (2013.01); *G09G 2310/0272* (2013.01); *G09G 2310/08* (2013.01)

(58) Field of Classification Search
None
See application file for complete search history.

(56) References Cited

U.S. PATENT DOCUMENTS

2005/0174344 A1 8/2005 La
2009/0085927 A1 4/2009 Jung
2018/0046007 A1* 2/2018 Lee ..................... G09G 3/3688

FOREIGN PATENT DOCUMENTS

AU 2002359978 A1 2/2004
CN 1620628 A 5/2005
(Continued)

OTHER PUBLICATIONS

International Search Report and Written Opinion dated Feb. 26, 2020 for PCT Patent Application No. PCT/CN2019/123036.

*Primary Examiner* — Aneeta Yodichkas
(74) *Attorney, Agent, or Firm* — Thomas | Horstemeyer, LLP

(57) ABSTRACT

The present disclosure provides a driving method of a display device and a display device. The driving method of the display device includes: inputting a gate signal with a length of a first duration to each of gate lines; and inputting a data signal to each of data lines to drive the display device for displaying. Among M data lines crossing the gate line in a direction of the gate line from a signal input terminal to an terminal away from the signal input terminal, a start time at which an $m^{th}$ data line input with the data signal is delayed (Continued)

by a second duration, relative to the start time at which a first data line closest to the signal input terminal of the gate line is input with the data signal, and the second duration is less than the first duration.

17 Claims, 9 Drawing Sheets

(56) References Cited

FOREIGN PATENT DOCUMENTS

| | | |
|---|---|---|
| CN | 101398584 A | 4/2009 |
| CN | 104361878 A | 2/2015 |
| CN | 105825803 A | 8/2016 |
| CN | 104361878 B | 1/2017 |
| CN | 107507594 A | 12/2017 |
| CN | 105825803 B | 12/2018 |
| JP | H11259050 A | 9/1999 |
| WO | 2004010209 A1 | 1/2004 |

\* cited by examiner

DRIVING METHOD OF DISPLAY DEVICE AND DISPLAY DEVICE

CROSS-REFERENCE TO RELATED APPLICATIONS

The present application is a national phase application under 35 U.S.C. § 371 of International Patent Application No. PCT/CN2019/123036, filed on Dec. 4, 2019, which claims the benefit of and priority to Chinese Patent Application No. 201910074232.4, filed on Jan. 25, 2019, the entire contents of which are incorporated herein by reference.

TECHNICAL FIELD

Embodiments of the present disclosure relate to a driving method of a display device and a display device.

BACKGROUND

With the continuous development of display technology, a thin film transistor liquid crystal display (TFT-LCD) has gradually become the mainstream of the market. The thin film transistor liquid crystal display typically includes an array substrate, a counter substrate, and a liquid crystal layer between the array substrate and the counter substrate. Liquid crystal molecules in the liquid crystal layer are driven by electrodes on the array substrate to be deflected, thereby realizing a display function.

Generally, the thin film transistor liquid crystal display includes a plurality of gate lines and a plurality of data lines crossing each other to define a plurality of pixel units. Each of the pixel units includes a thin film transistor and a pixel electrode. A gate of the thin film transistor is coupled to a corresponding gate line, a source of the thin film transistor is coupled to a corresponding data line, and a drain of the thin film transistor is coupled to the pixel electrode. The display is driven in a time-sharing manner for displaying by inputting scan signals to the gate lines and data signals to the data lines.

SUMMARY

Embodiments of the present disclosure provide a driving method of a display device and a display device. The driving method of the display device includes inputting a gate signal with a length of a first duration to each of gate lines, and inputting a data signal to each of data lines to drive the display device for displaying. In a direction of the gate line from a signal input terminal to one terminal away from the signal input terminal, a start time at which the data line far away from the signal input terminal is input with the data signal is delayed by a second duration relative to the start time at which the data line closest to the signal input terminal is input with the data signal, and the second duration is less than the first duration.

In a driving method of a display device provided by at least one embodiment of the present disclosure, the display device includes a plurality of gate lines and a plurality of data lines crossing each other, each of the gate lines includes a signal input terminal, and the driving method includes: inputting a gate signal with a length of a first duration to each of the gate lines; and inputting a data signal to each of the data lines to drive the display device for displaying. Among M data lines crossing the gate line in a direction of the gate line from the signal input terminal to one terminal away from the signal input terminal, a start time at which an $m^{th}$ data line is input with the data signal is delayed by a second duration relative to the start time at which a first data line closest to the signal input terminal of the gate line is input with the data signal, and the second duration is less than the first duration, where M and m are both positive integers greater than or equal to 2, and m is less than or equal to M.

For example, in the driving method of the display device provided by an embodiment of the present disclosure, the plurality of data lines include N data line groups; in each of the data line groups, the start time at which each of the data lines is input with the data signal is the same; and in the direction of the gate line from the signal input terminal to one terminal away from the signal input terminal, the second durations of the N data line groups are increased gradually as distances from the N date line groups to the signal input terminal are increased, where N is a positive integer greater than or equal to 1.

For example, in the driving method of the display device provided by an embodiment of the present disclosure, the driving method further includes: determining an overall delay time $T_{CLK}$ of each of the gate lines; and dividing the overall delay time into N parts equally, wherein the second time of an $n^{th}$ data line group of the N data line groups is $y=(n-1)\times T_{CLK}/N$, where n is a positive integer, and $1 \le n \le N$.

For example, in the driving method of the display device provided by an embodiment of the present disclosure, the overall delay time $T_{CLK}$ of each of the gate lines satisfies the following formula:

$$T_{CLK}=(2^j \times T_j \times 2^{j-1} \times T_{j-1}+ \ldots +2^2 \times T_2 \times 2^1 \times T_1+2^0 \times T_0 \times k) \times 2t,$$

where t is a signal clock period, k is a correction base, $T_0$, $T_1, T_2 \ldots T_j$ have a value range of 1 or 0, j has a value range of 4-8, and k has a value range of 0-10.

For example, in the driving method of the display device provided by an embodiment of the present disclosure, j has a value of 4, 6, or 8.

For example, in the driving method of the display device provided by an embodiment of the present disclosure, the display device includes N source drivers configured to apply the data signals to the plurality of data lines, and the driving method includes driving the N data line groups by using the N source drivers, respectively.

For example, in the driving method of the display device provided by an embodiment of the present disclosure, the plurality of gate lines includes a plurality of first gate lines and a plurality of second gate lines, and the plurality of first gate lines are arranged to correspond to the plurality of second gate lines one by one. The signal input terminal of the first gate line is located at a first edge of the display device, and the signal input terminal of the second gate line is located at a second edge, opposite to the first edge, of the display device. The first gate line and the second gate line arranged correspondingly are configured to be applied with the gate signals of a same timing.

For example, in the driving method of the display device provided by an embodiment of the present disclosure, the first gate line and the second gate line arranged correspondingly are coupled with each other.

For example, in the driving method of the display device provided by an embodiment of the present disclosure, the display device further includes a plurality of pixel units defined by intersections of the plurality of gate lines and the plurality of data lines, and each of the pixel units includes a thin film transistor, a gate of the thin film transistor is coupled to the gate line, and a source of the thin film transistor is coupled to the data line.

For example, in the driving method of the display device provided by an embodiment of the present disclosure, the gate signal is a first pulse signal, and the data signal is a second pulse signal.

For example, in the driving method of the display device provided by an embodiment of the present disclosure, the step of inputting a data signal to each of the data lines further includes inputting a positive data signal or a negative data signal to the data line. Relative to the start time at which the first data line closest to the signal input terminal is input with the data signal, the start time at which the $m^{th}$ data line is input with the negative data signal is delayed by the second duration, and the start time at which an $s^{th}$ data line is input with the positive data signal is delayed by a third duration. The second duration and the third duration are both less than the first duration, the second duration is greater than the third duration, and a difference between the second duration and the third duration is less than an effective level duration within one data signal period, where m and s are both positive integers greater than or equal to 2, and m and s are both less than or equal to M.

For example, in the driving method of the display device provided by an embodiment of the present disclosure, the difference between the second duration and the third duration is Δt, and Δt is equal to a time difference between an off-time of a switching element corresponding to the negative data signal and the off time of the switching element corresponding to the positive data signal.

For example, in the driving method of the display device provided by an embodiment of the present disclosure, m≠s, the start time at which the $m^{th}$ data line is input with the negative data signal is delayed by the second duration, the start time at which the $s^{th}$ data line is input with the positive data signal is delayed by the third duration, the second duration is greater than the third duration, and the difference between the second duration and the third duration is less than the effective level duration within the one data signal period.

For example, in the driving method of the display device provided by an embodiment of the present disclosure, m=s, the second duration by which the start time at which the $m^{th}$ data line is input with the negative data signal at a first frame is delayed is greater than the third duration by which the start time at which the $s^{th}$ data line is input with the positive data signal at a second frame is delayed, and the difference between the second duration and the third duration is less than the effective level duration within the one data signal period.

At least one embodiment of the present disclosure provides a display device, including: a plurality of gate lines and a plurality of data lines, crossing each other, and each of the gate lines including a signal input terminal; and a driver, configured to drive the display panel for displaying. The driver includes: at least one gate driver configured to input a gate signal with a length of a first duration to each of the gate lines; and at least one source driver configured to input a data signal to each of the data lines to drive the display device for displaying. Among M data lines crossing the gate line in a direction of the gate line from the signal input terminal to one terminal away from the signal input terminal, a start time at which an $m^{th}$ data line is input with the data signal is delayed by a second duration, relative to the start time at which a first data line closest to the signal input terminal of the gate line is input with the data signal. The second duration is less than the first duration, where M and m are both positive integers greater than or equal to 2, and m is less than or equal to M.

For example, in the display device provided by an embodiment of the present disclosure, the driver further includes: a delay driver, configured to enable the source driver so that among the M data lines crossing the gate line in the direction of the gate line from the signal input terminal to the one terminal away from the signal input terminal, the start time at which the $m^{th}$ data line is input with the data signal is delayed by the second duration, relative to the start time at which the first data line closest to the signal input terminal is input with the data signal. The second duration is less than the first duration, where M and m are both the positive integers greater than or equal to 2, and m is less than or equal to M.

For example, in the display device provided by an embodiment of the present disclosure, the plurality of data lines include N data line groups, the at least one source driver includes N source drivers configured to apply the data signals to the plurality of data lines, and the N source drivers are configured to respectively drive the N data line groups. In the direction of the gate line from the signal input terminal to the one terminal away from the signal input terminal, the second durations of the N data line groups are increased gradually as distances from the N date line groups to the signal input terminal are increased.

For example, in the display device provided by an embodiment of the present disclosure, the source driver is configured to input a positive data signal or a negative data signal to the data line. Relative to the start time at which the first data line closest to the signal input terminal is input with the data signal, the start time at which the $m^{th}$ data line is input with the negative data signal is delayed by the second duration, and the start time at which an $s^{th}$ data line is input with the positive data signal is delayed by a third duration. The second duration and the third duration are both less than the first duration, the second duration is greater than the third duration, a difference between the second duration and the third duration is less than an effective level duration within one data signal period, and m and s are both positive integers greater than or equal to 2, and m and s are both less than or equal to M.

For example, in the display device provided by an embodiment of the present disclosure, the driver further includes: a delay driver, configured to enable the source driver so that in the direction of the gate line from the signal input terminal to the one terminal away from the signal input terminal, relative to the start time at which the first data line closest to the signal input terminal is input with the data signal, the start time at which the $m^{th}$ data line is input with the negative data signal is delayed by the second duration, and the start time at which the $s^{th}$ data line is input with the positive data signal is delayed by the third duration. The second duration is greater than the third duration, and the difference between the second duration and the third duration is less than the effective level duration within the one data signal period.

For example, in the display device provided by an embodiment of the present disclosure, the delay driver includes a timing controller configured to output a data transmission control signal. The source driver further includes a reserving register, and the reserving register is configured to control the start time of the positive data signal or the negative data signal in response to the data transmission control signal, so that the start time at which the $m^{th}$ data line is input with the negative data signal is delayed by the second duration, and the start time at which the $s^{th}$ data line is input with the positive data signal is delayed by the third duration. The second duration is greater than the third duration, and the difference between the second duration and the third duration is less than the effective level duration within the one data signal period.

BRIEF DESCRIPTION OF THE DRAWINGS

In order to more clearly explain the technical solutions of the embodiments of the present disclosure, the drawings of the embodiments will be briefly described below. Understandably, the drawings in the following description only relate to some embodiments of the present disclosure, rather than limit the present disclosure.

DETAILED DESCRIPTION

Figure 1:
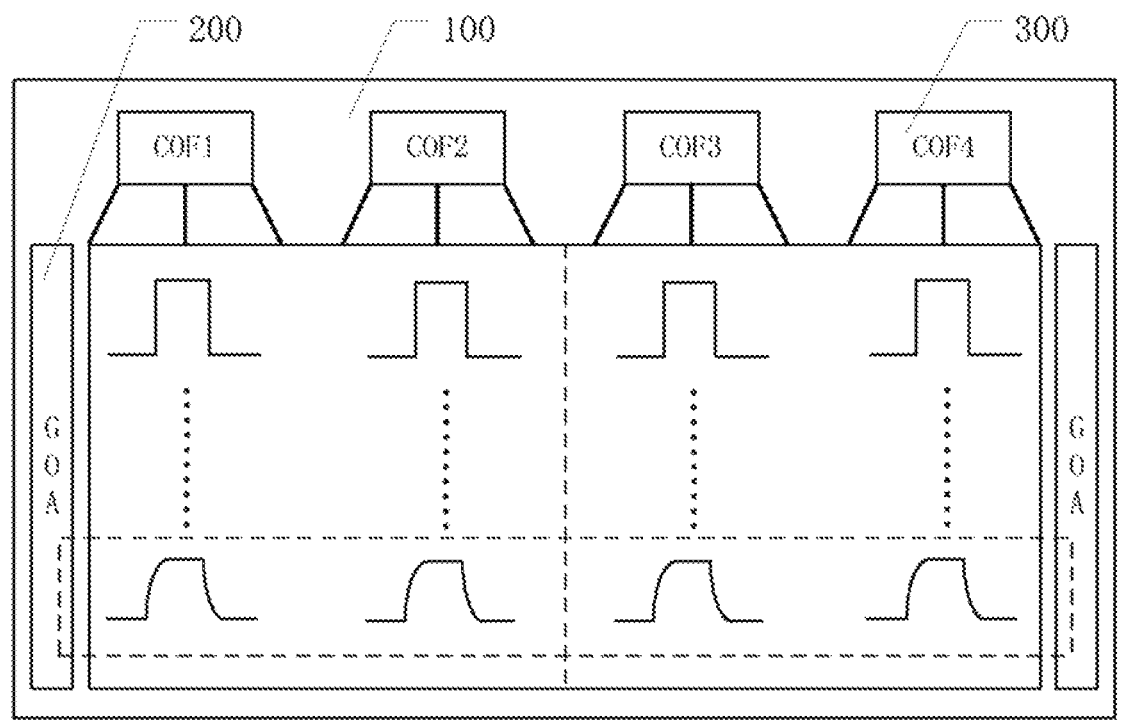
FIG. 1 is a schematic diagram of a display device.

To make the objectives, technical solutions, and advantages of the embodiments of the present disclosure more clear, the technical solutions of the embodiments of the present disclosure will be described clearly and completely in conjunction with the drawings of the embodiments of the present disclosure. Understandably, the described embodiments are a part not all of the embodiments of the present disclosure. Based on the described embodiments of the present disclosure, all other embodiments obtained by those skilled in the art without creative efforts fall within the protection scope of the present disclosure.

Unless otherwise defined, technical or scientific terms used in the present disclosure shall have ordinary meanings understood by those skilled in the art to which the present disclosure belongs. The terms "first", "second", and the like used in the present disclosure do not indicate any order, quantity, or importance, but are only used to distinguish different components. Terms such as "include", "comprise", or the like mean that an element or object before the term cover an element or object listed after the term and their equivalents, but do not exclude other elements or objects. Terms such as "connect", "couple", or the like are not limited to physical or mechanical connections, but may include electrical connections, regardless of being direct or indirect.

With the continuous improvement of a resolution of a display device, a 4K display device (a display device with a 4K resolution, the 4K resolution may include 4096×3112, 3656×2664 and other standards) is increasingly saturated in the display market. An 8K display device has been studying enthusiastically by major manufacturers. For example, an 8K resolution reaches a pixel size of 7680×4320, which is 4 times the 4K resolution, and thus it can bring fine high-quality picture.

On the other hand, a large-size display device has become a popular carrier for the 8K resolution technology. However, a large-size, high-resolution display device has a problem with panel charging rate. Taking an 8K resolution large-size display device as an example, a turning-on duration of a row of pixels is only 3.7 μs, and an actual effective pixel charging time is less. Further, the higher the resolution of the display device is, the more the pixels are to be driven in a unit area. Therefore, an entire panel of the display device cannot be effectively charged. The effect of adjusting a charging time is limited on the 8K resolution, large-size display device due to a short charging time. For some pictures with high power consumption, it is easy to produce a screen-division and a Mura defect caused by a non-uniform charging rate. Therefore, how to maximize uniformity of charging capabilities of the respective pixels on the entire panel of the display device in a limited time to eliminate the screen-division caused by uneven charging and the Mura defect caused by the non-uniform charging rate is a problem that needs to be solved urgently.

Figure 2:
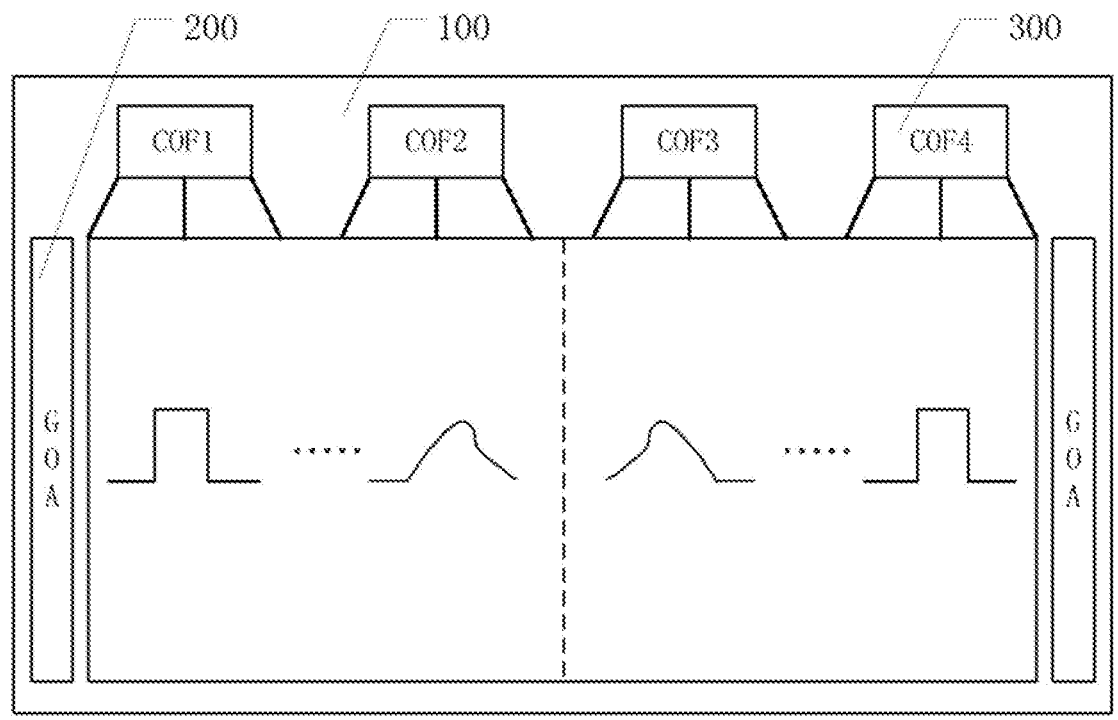
FIG. 2 is a schematic diagram of another display device.

In research, the inventors of the present application found that the above-mentioned problem is caused mainly because signal lines (e.g., gate lines and data lines) of the display device may cause signal attenuation and delay due to impedance. FIG. 1 is a schematic diagram of a display device, and FIG. 2 is a schematic diagram of another display device. As shown in FIGS. 1 and 2, the display device includes a display panel 100, a gate driver 200 and a source driver 300. The display panel 100 includes an array substrate, a counter substrate, a gate line, and a data line. The gate driver 200 may be a GOA (Gate On Array) circuit, which is disposed on the array substrate, and may be disposed on two opposite edges of the display device so that the signal on the driving gate line may be transmitted from the two opposite edges of the display device to the middle of the display device. The source driver 300 may be a chip on film (COF). FIG. 1 shows a schematic diagram of signal delay on the data line. As shown in FIG. 1, in an extending direction of the data line, relative to the signal on a part of the data line near a signal input terminal, the signal on the part of the data line far from the signal input terminal, that is, the signal on the part far from the source driver 300 is delayed. FIG. 2 shows a schematic diagram of signal delay on the gate line. As shown in FIG. 2, in an extending direction of the gate line, relative to the signal on the part of the gate line near a signal input terminal, the signal on the part of the gate line far from the signal input terminal, that is, the signal on the part far from the gate driver 200 is delayed.

Figure 3:
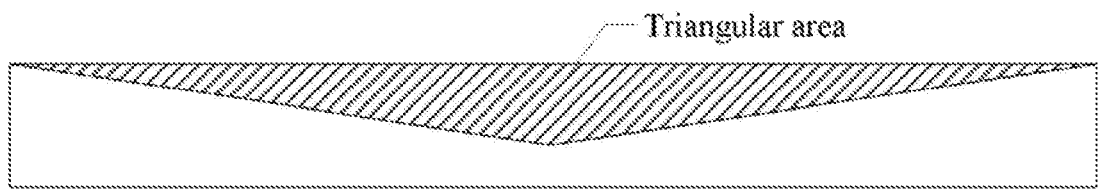
FIG. 3 is a simulation effect diagram of superposition of signal delay on gate lines and that on data lines of a display device.
Figure 4:
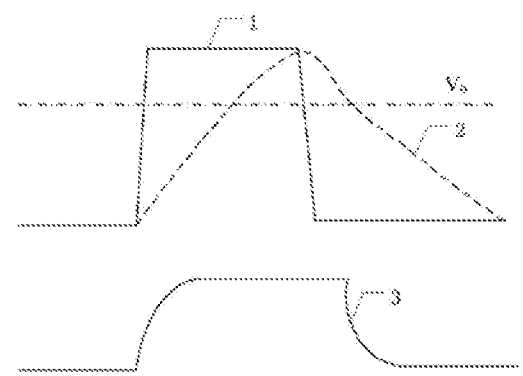
FIG. 4 is a waveform diagram of signals on a gate line and a data line of a display device.

FIG. 3 shows a simulation effect diagram of superposition of signal delay on gate lines and that on data lines of a display device. As shown in FIG. 3, when the signal delay of the gate line and the signal delay of the data line are superimposed, the signal on a terminal of the gate line away from a signal input terminal of the gate line and the signal on a terminal of the data line away from a signal input terminal of the data line would not match each other, resulting in insufficient charging time and thus insufficient charging. As shown in FIG. 3, the screen-division and the Mura defect in the triangular area in FIG. 3 are relatively noticeable. FIG. 4 shows a waveform diagram of signals on the gate line and the data line of the display device. As shown in FIG. 4, the signal on the part of the gate line near the signal input terminal is shown in line 1 in FIG. 4, and the signal on the part of the gate line far from the signal input terminal is shown in line 2 in FIG. 4. The signal on the part of the gate line away from the signal input terminal may be delayed and deformed due to the impedance of the gate line. When a signal voltage on the gate line is greater than a certain value (for example, $V_0$), a thin film transistor can be turned on, which results in that an effective charging time of the signal on the part of the gate line away from the signal input terminal is less than the effective charging time of the signal on the part of the gate line near the signal input terminal. When the data signal shown by line 3 is input to the data line through the source driver, an effective charging area of the data signal and the signal on the part of the gate line near the signal input terminal is greater than the effective charging area of the data signal and the signal on the part of the gate line away from the signal input terminal, which results in that the charging time of the pixel unit corresponding to the part of the gate line away from the signal input terminal is shorter than the charging time of the pixel unit corresponding to the part of the gate line near the signal input terminal.

An embodiment of the present disclosure provides a driving method of a display device, a driver, and a display device. In the driving method of the display device, the display device includes a plurality of gate lines and a plurality of data lines crossing each other, each of the gate lines includes a signal input terminal, and the driving method includes: inputting a gate signal with a length of a first duration to each of the gate lines; and inputting a data signal to each of the data lines to drive the display device for displaying. Among M data lines crossing the gate line in a direction of the gate line from the signal input terminal to one terminal away from the signal input terminal, a start time at which an $m^{th}$ data line is input with the data signal is delayed by a second duration relative to the start time at which a first data line closest to the signal input terminal of the gate line is input with the data signal, and the second duration is less than the first duration, where M and m are both positive integers greater than or equal to 2, and m is less than or equal to M. Therefore, the signal on the data line may match signal attenuation and delay of the gate line. On one hand, it reduces a charging time of a pixel unit corresponding to the data line near the signal input terminal of the gate line, and on the other hand, it increases the charging time of the pixel unit corresponding to the data line far from the signal input terminal of the gate line, which improves uniformity of the charging times of the pixel units arranged along an extending direction of the gate line in the display device. Therefore, a screen-division caused by uneven charging and a Mura defect caused by a non-uniform charging rate may be reduced or even eliminated.

The driving method of the display device, the driver, and the display device provided by the embodiment of the present disclosure will be described in detail below with reference to the drawings.

Figure 5:
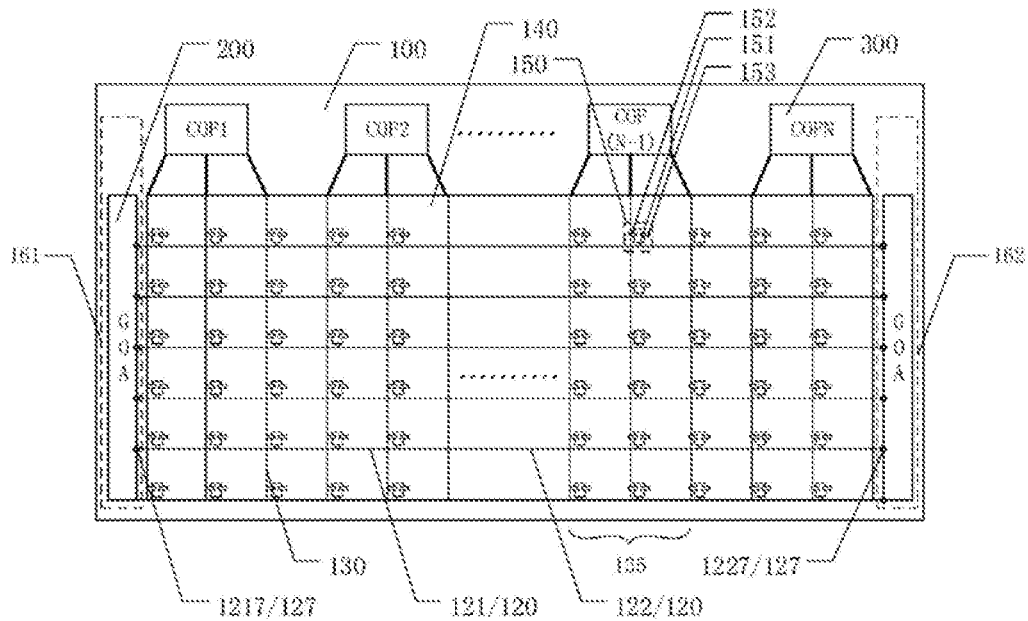
FIG. 5 is a schematic plan view of a display device according to an embodiment of the present disclosure.
Figure 6:
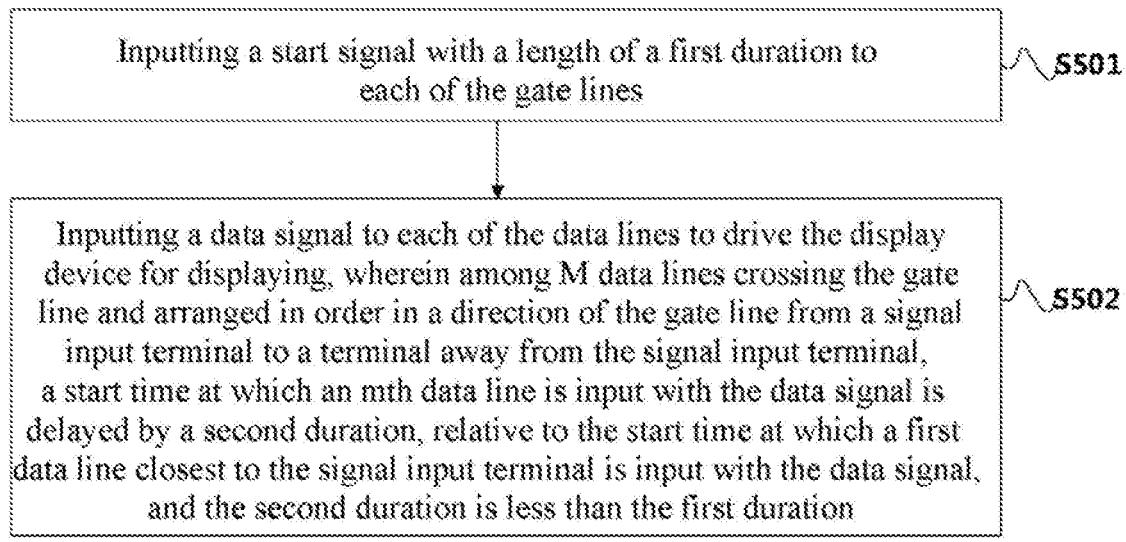
FIG. 6 is a flowchart of a driving method of a display device according to an embodiment of the present disclosure.
Figure 7:
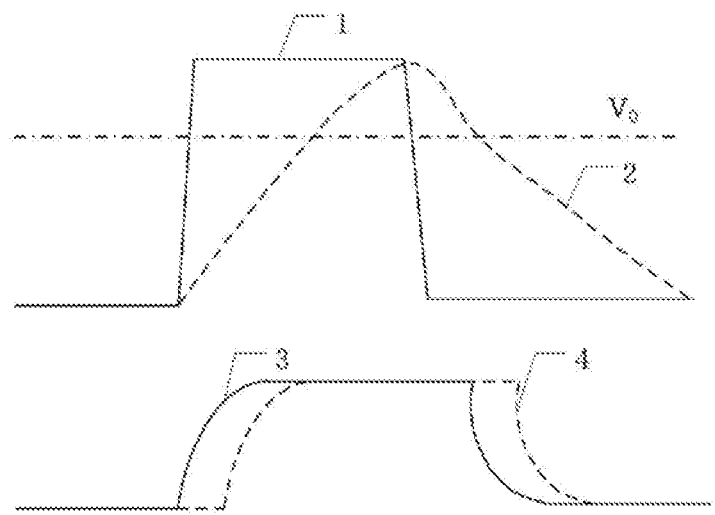
FIG. 7 is a waveform diagram of signals on a gate line and a data line of a display device according to an embodiment of the present disclosure.

FIG. 5 is a schematic plan view of a display device according to an embodiment of the present disclosure. FIG. 6 is a flowchart of a driving method of a display device according to an embodiment of the present disclosure. FIG. 7 is a waveform diagram of signals on a gate line and a data line of a display device according to an embodiment of the present disclosure.

As shown in FIG. 5, the display device includes a plurality of gate lines 120 and a plurality of data lines 130 crossing each other, each of the gate lines 120 includes a signal input terminal 127, and the plurality of data lines 130 are arranged along an extending direction of the gate line 120. As shown in FIG. 6, the driving method includes the following steps S501-S502.

In S501, a gate signal with a length of a first duration is input to each of the gate lines. It should be noted that the above "length" refers to a time duration of the gate signal.

In S502, a data signal is input to each of the data lines to drive the display device for displaying. Among M data lines crossing the gate line in a direction of the gate line from the signal input terminal to one terminal away from the signal input terminal, a start time at which an $m^{th}$ data line is input with the data signal is delayed by a second duration, relative to the start time at which a first data line closest to the signal input terminal of the gate line is input with the data signal. The second duration is less than the first duration, where M and m are both positive integers greater than or equal to 2, and m is less than or equal to M. It should be noted that the above data line for comparison of the start time corresponds to one data line of the plurality of gate lines. That is, when one of the plurality of gate lines is input with the gate signal with the length of the first duration, among M data lines crossing the gate line in the direction of the gate line from the signal input terminal to one terminal away from the signal input terminal, the start time at which the $m^{th}$ data line is input with the data signal is delayed by the second duration relative to the start time at which the first data line closest to the signal input terminal of the gate line is input with the data signal, the second duration is less than the first duration, where M and m are both positive integers greater than or equal to 2, and m is less than or equal to M.

In the driving method of the display device according to an embodiment of the present disclosure, as shown in FIG. 7, the signal on the part of the gate line near the signal input terminal is shown in line 1 in FIG. 7, and the signal on the part of the gate line far from the signal input terminal is shown in line 2 in FIG. 7. The signal on the part of the gate line away from the signal input terminal may be delayed and deformed due to the impedance of the gate line. When a signal voltage on the gate line is greater than a certain value (for example, $V_0$), a thin film transistor can be turned on, which results in that an effective charging time of the signal on the part of the gate line away from the signal input terminal is less than the effective charging time of the signal on the part of the gate line near the signal input terminal.

When the data signal (a typical data signal) shown by line 3 is input to the data line through the source driver, an effective charging area of the data signal and the signal on the part of the gate line near the signal input terminal is greater than the effective charging area of the data signal and the signal on the part of the gate line away from the signal input terminal, which results in that the charging time of the pixel unit corresponding to the part of the gate line near the signal input terminal is shorter than the charging time of the pixel unit corresponding to the part of the gate line away from the signal input terminal. When the data signal (a data signal of the present disclosure) shown by line 4 is input to the data line through the source driver, the data signal is delayed by the second duration relative to the data signal shown by line 3, that is, relative to the start time at which the $m^{th}$ data line is input with data line, and the second duration is less than the first duration. Therefore, the signal on the data line may match signal attenuation and delay of the gate line. Further, it increases the charging time of the pixel unit corresponding to the data line far from the signal input terminal of the gate line, which improves uniformity of the charging times of the pixel units arranged along an extending direction of the gate line in the display device. Therefore, a screen-division caused by uneven charging and a Mura defect caused by a non-uniform charging rate may be reduced or even eliminated.

It should be noted in the present disclosure that the first duration and the second duration both refer to a time period, not a time point.

For example, in some examples, as shown in FIG. 5, the plurality of data lines 130 may be divided into N data line groups 135, that is, the plurality of data lines 130 include the N data line groups 135. In each of the data line groups 135, the start time at which each of the data lines 130 is input with the data signal is the same. That is, in each of the data line groups 135, the start times at which the respective data lines 130 are input with the data signals are not delayed relative to each other. In the direction of the gate line from the signal input terminal to one terminal away from the signal input terminal, the second durations of the N data line groups are increased gradually as distances from the N date line groups to the signal input terminal are increased. As the distances from the N date line groups to the signal input terminal are increased, the signal delay on the gate line is increased gradually. Therefore, with that the second durations of the N data line groups are increased gradually as the distances from the N date line groups to the signal input terminal are increased, it may further improve the uniformity of the charging times of the pixel units arranged along the extending direction of the gate line in the display device. Therefore, the screen-division caused by uneven charging and the Mura defect caused by a non-uniform charging rate may be further reduced or even eliminated.

For example, in some examples, the driving method further includes determining an overall delay time $T_{CLK}$ of each of the gate lines, and dividing the overall delay time into N parts equally. The second time of an $n^{th}$ data line group of the N data line groups is $y=(n-1) \times T_{CLK}/N$. Therefore, amounts that the second durations of the N data line groups are increased gradually are more uniform as the distances from the N date line groups to the signal input terminal are increased, which may further improve the uniformity of the charging times of the pixel units arranged along the extending direction of the gate line in the display device. Therefore, the screen-division caused by uneven charging and the Mura defect caused by a non-uniform charging rate may be further reduced or even eliminated.

For example, a value of N may be 24, that is, the data lines 130 include 24 data line groups 135. In this case, the second time of the $n^{th}$ data line group in the 24 data line groups is $y=(n-1) \times T_{CLK}/24$, where n is a positive integer, and $1 \leq n \leq N$.

For example, in some examples, the overall delay time $T_{CLK}$ of each of the gate lines satisfies the following formula:

$$T_{CLK}=(2^j \times T_j + 2^{j-1} \times T_{j-1} + \ldots + 2^2 + T_2 + 2^1 \times T_1 + 2^0 \times T_0 + k) \times 2t,$$

where t is a signal clock period, k is a correction base, $T_0, T_1, T_2 \ldots T_j$ have a value range of 1 or 0, j has a value range of 4-8, and k has a value range of 0-10.

In the driving method, as the values of $T_0, T_1, T_2 \ldots T_j$ are different, different overall delay times may be obtained, and display effects of the display device may be obtained by driving the display device for displaying through the above driving method, so that the values of $T_0, T_1, T_2 \ldots T_j$ at which the screen-division and the Mura defect are weakened may be obtained according to the display effects of the display device. In addition, the values of $T_0, T_1, T_2 \ldots T_j$ may be represented by a binary value, which is convenient for calculation and storage. In addition, the correction base k may ensure that the overall delay time of the gate line has a minimum correction value. It should be noted that there are many factors that affect the signal delay on the gate line, and the specific parameters of different display devices are different. However, when the overall delay time of the gate line is calculated using the above formula, only the j value needs to be adjusted, which facilitates the calculation, and thus is simple and effective.

For example, when the display device is an 8k resolution display device of 75 inches, the value range of k may be 4-6, for example, k=5.

For example, the above-mentioned signal clock period t may range from 5 to 10 μs.

It should be noted that the above specific value ranges of k and t may be determined according to specific parameters of the display device. The embodiments of the present disclosure include but are not limited to the above value ranges.

For example, in some examples, the value of j is 4, 6, or 8. When the value of j is 4, the calculation amount is small. When the value of j is 8, the overall delay time of the gate line is large, which is suitable for the calculation of larger-size, higher-resolution display devices, and the effect it is good.

For example, as shown in FIG. 5, the display device includes N source drivers 300 configured to apply the data signals to the plurality of data lines 130. The driving method includes driving the N data line groups 135 respectively using the N source drivers 300. Therefore, the start times at which each of the source drivers 300 inputs the data signal to the respective data lines 130 are not delayed with respect to each other, and the start times at which different source drivers 300 apply the data signals to the data lines 130 are different, thereby reducing the calculation pressure of each of the source drivers 300.

For example, in some examples, as shown in FIG. 5, the display device further includes a plurality of pixel units 140 defined by intersections of the plurality of gate lines 120 and the plurality of data lines 130, each of the pixel units 140 includes a thin film transistor 150, a gate 151 of the thin film transistor 150 is coupled to the gate line 120, and a source 152 of the thin film transistor 150 is coupled to the data line 130. Thus, the thin film transistor 150 may be turned on by the gate signal on the gate line 120, so that the data signal on the data line 130 may transmit from the source 152 of the thin film transistor 150 to the drain 153 of the thin film transistor 150 and be applied to a pixel electrode (not shown).

For example, in some examples, the gate signal is a first pulse signal; and the data signal is a second pulse signal.

For example, as shown in FIG. 5, the plurality of gate lines 120 includes a plurality of first gate lines 121 and a plurality of second gate lines 122, and the plurality of first gate lines 121 are arranged to correspond to the plurality of second gate lines 122 one by one. The signal input terminal 1217 of the first gate line 121 is located at a first edge 161 of the display device, and the signal input terminal 1227 of the second gate line 122 is located at a second edge 162, opposite to the first edge 161, of the display device. The first gate line 121 and the second gate line 122 arranged correspondingly are configured to be applied with the gate signals of a same timing.

For example, in some examples, the first gate line 121 and the second gate line 122 arranged correspondingly may be coupled with each other. It should be noted that in this case, the overall delay times may be calculated independently or separately for the first gate line 121 and the second gate line 122.

For example, as shown in FIG. 5, it may calculate the overall delay time $T_{CLK}$ of the entirety of the first gate line 121 and the second gate line 122 arranged correspondingly. The data lines 130 crossing the first gate line 121 may be divided into N/2 data line groups, and the data lines 130 crossing the second gate line 122 may be divided into N/2 data line groups. In this case, the overall delay time $T_{CLK}$ may be equally divided into N parts, the second duration in an $n1^{th}$ data line group in the N/2 data line groups crossing the first gate line 121 is $y1=(n1-1)\times T_{CLK}/N$, and the second duration in an $n2^{th}$ data line group in the N/2 data line groups crossing the second gate line 122 is $y2=(n2-1)\times T_{CLK}/N$.

Figure 8:
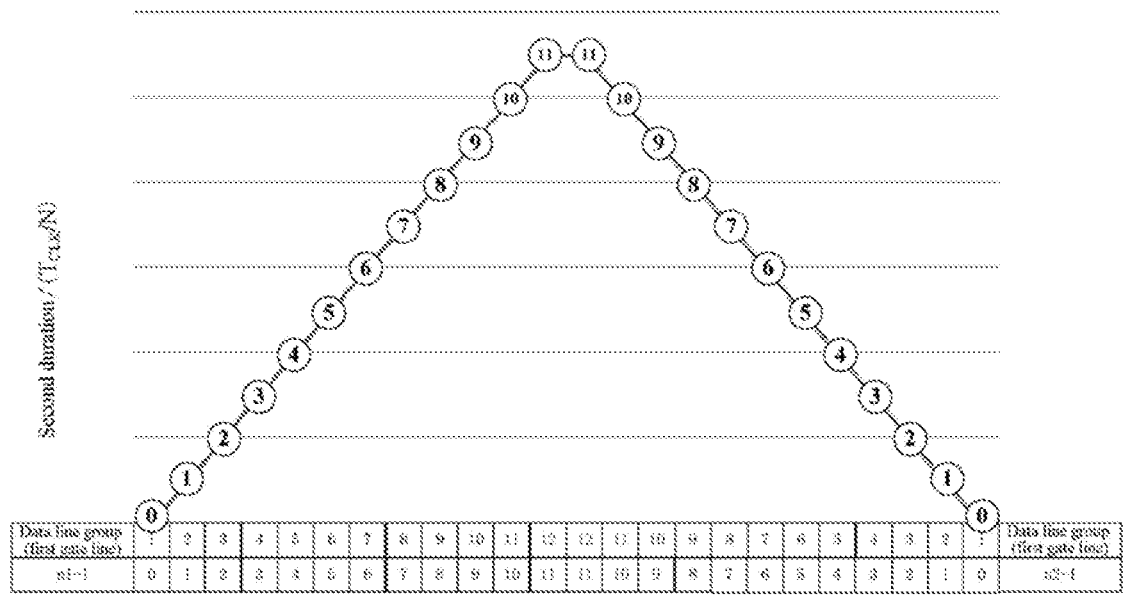
FIG. 8 is a graph showing a change of a second duration of a data line group in a driving method of a display device according to an embodiment of the present disclosure.
Figure 9:
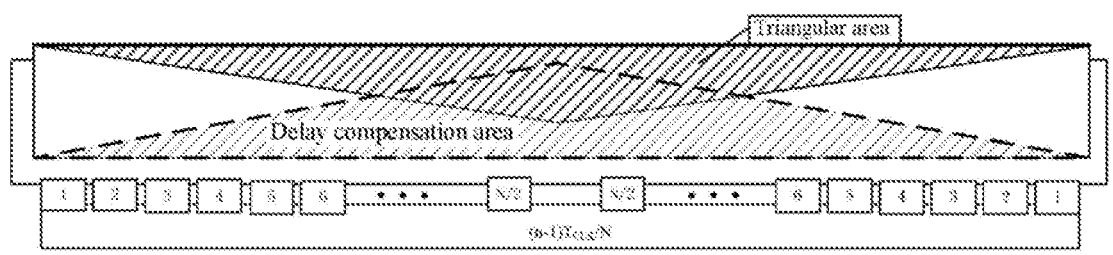
FIG. 9 is a schematic diagram showing an effect of a signal delay compensation of a gate line and a data line in a driving method of a display device according to an embodiment of the present disclosure.

FIG. 8 is a graph showing a change of the second duration of the data line group in the driving method of the display device according to an embodiment of the present disclosure. As shown in FIG. 8, the value of N may be 24, that is, the data lines include 24 data line groups. In this case, in the direction of the first gate line from the signal input terminal to that away from the signal input terminal, the second durations of the N/2 data line groups crossing the first gate line may respectively be: 0, $T_{CLK}/N$, $2T_{CLK}/N$, ..., (N/2−1) $T_{CLK}/N$; and in the direction of the second gate line from the signal input terminal to that away from the signal input terminal, the second durations of the N/2 data line groups crossing the second gate line may respectively be: 0, $T_{CLK}/N$, $2T_{CLK}/N$, ..., (N/2−1) $T_{CLK}/N$. FIG. 9 is a schematic diagram showing an effect of a signal delay compensation of the gate line and the data line in the driving method of the display device according to an embodiment of the present disclosure. As shown in FIG. 9, a delay compensation area formed by a changing curve of the second duration of the data line group may exactly match the triangular area shown in FIG. 3 where the signal delays of the gate line and the data line are superimposed, so that the uniformity of the charging rate or the charging effect of the pixel unit in the display device may be maximized, thereby improving the screen-division caused by uneven charging and the Mura defect caused by the non-uniform charging rate.

It should be noted that a slope of the changing curve of the second time duration of the data line group in FIG. 8 may be adjusted according to an actual situation. The slope may be determined according to a driving capability of the source driver. The higher the slope is, the larger the second duration is, which may be determined according to the impedance of the data line of the display device. In addition, the changing curve of the second duration of the data line group may be continuous or discontinuous, may be a straight line with a uniform slope, or a curve or a polyline with a varying slope, and the embodiments of the present disclosure include but are not limited to this. The changing curve of the second duration of the data line group may be changed according to the change of the signal on the gate line of the display device.

Figure 10:
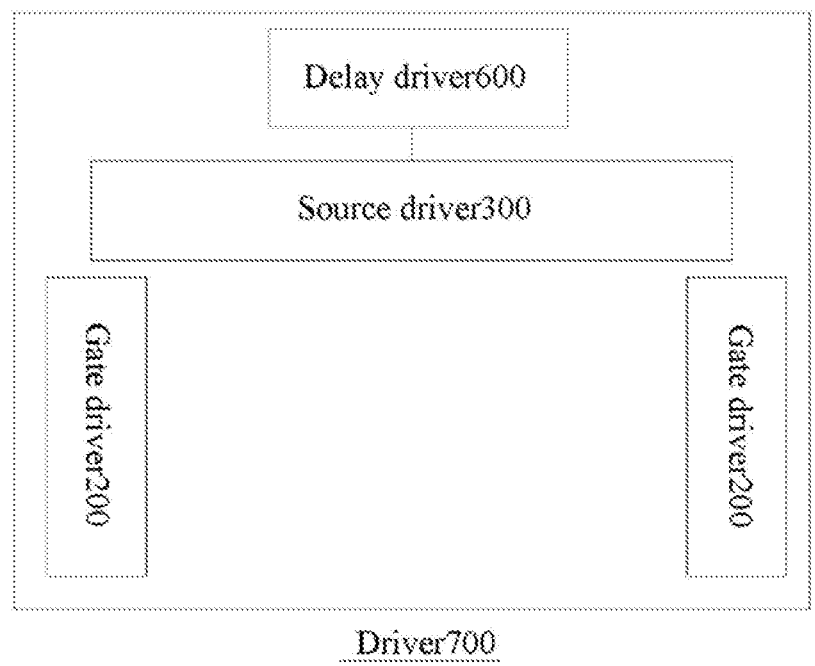
FIG. 10 is a schematic diagram of a driver according to an embodiment of the present disclosure.

FIG. 10 is a schematic diagram of a driver according to an embodiment of the present disclosure. As shown in FIG. 10, the driver 700 includes at least one gate driver 200 and at least one source driver 300. The gate driver 200 is configured to input a gate signal with a length of a first duration to a gate line, and the source driver 300 is configured to input a data signal to each of data lines to drive the display device for displaying. In a direction of the gate line from a signal input terminal thereof to one terminal away from the signal input terminal, a start time at which the data line far from the signal input terminal is input with the data signal is delayed by a second duration, relative to the start time at which the data line closest to the signal input terminal is input with the data signal, and the second duration is less than the first duration. Therefore, the signal on the data line may match signal attenuation and delay of the gate line. Further, it increases the charging time of the pixel unit corresponding to the data line far from the signal input terminal of the gate line, which improves uniformity of the charging times of the pixel units arranged along an extending direction of the gate line in the display device. Therefore, a screen-division caused by uneven charging and a Mura defect caused by a non-uniform charging rate may be reduced or even eliminated.

For example, in some examples, the driver further includes a delay driver 600, configured to enable the source driver 300, so that among M data lines crossing the gate line and arranged in order in the direction of the gate line from the signal input terminal to the one terminal away from the signal input terminal, the start time at which an $m^{th}$ data line is input with the data signal is delayed by the second duration, relative to the start time at which a first data line closest to the signal input terminal is input with the data signal, and the second duration is less than the first duration, where M and m are both the positive integers greater than or equal to 2, and m is less than or equal to M. That is to say, in this driver, the gate driver and the source driver may use a generally-used gate driver and source driver, and the delay driver 600 is provided additionally to enable the source driver 300, so that among M data lines crossing the gate line and arranged in order in the direction of the gate line from the signal input terminal to the one terminal away from the signal input terminal, the start time at which the $m^{th}$ data line is input with the data signal is delayed by the second duration, relative to the start time at which the first data line closest to the signal input terminal is input with the data signal, and the second duration is less than the first duration.

For example, in some examples, the plurality of data lines include N data line groups, and the at least one source driver 300 includes N source drivers 300 configured to apply the data signals to the plurality of data lines. The N source drivers 300 are configured to respectively drive the N data line groups, so that in the direction of the gate line from the signal input terminal to the one terminal away from the signal input terminal, the second durations of the N data line groups are increased gradually as distances from the N date line groups to the signal input terminal are increased.

An embodiment of the present disclosure also provides a display device including any one of the above drivers, so that the uniformity of the charging times of the pixel units arranged along the extending direction of the gate line in the display device may be improved. Therefore, the screen-division caused by uneven charging and the Mura defect caused by the non-uniform charging rate may be reduced or even eliminated.

For example, in some examples, the display device may be a product with a display function such as a television, a computer, a navigator, a notebook computer, a mobile phone, an electronic album, and the like.

For example, in some examples, the resolution of the display device is of ultra-high definition (UHD), for example, the resolution is greater than or equal to 4K*2K. For another example, the resolution of the display device is greater than or equal to 8K*4K. Here, 4K*2K means a physical resolution of 3840×2160, and 8K*4K means a physical resolution of 7680×4320.

The above example illustrates that the start time at which the data line is input with the data signal is delayed to eliminate the screen-division caused by uneven charging and the Mura defect caused by the non-uniform charging rate. It should be noted that in the present disclosure, the delay of the start time of the data signal may refer to that the start times of the data signals of all the other data lines than the first data line nearest the gate signal input terminal are delayed, or may refer to that the start times of the data signals of part of the other data lines than the first data line nearest the gate signal input terminal are delayed.

However, the applicant found that the data signals are divided into a positive data signal and a negative data signal. For the data signals of different polarities, if the same delay is performed, there may still be uneven charging. This is will be described below in detail.

Figure 11:
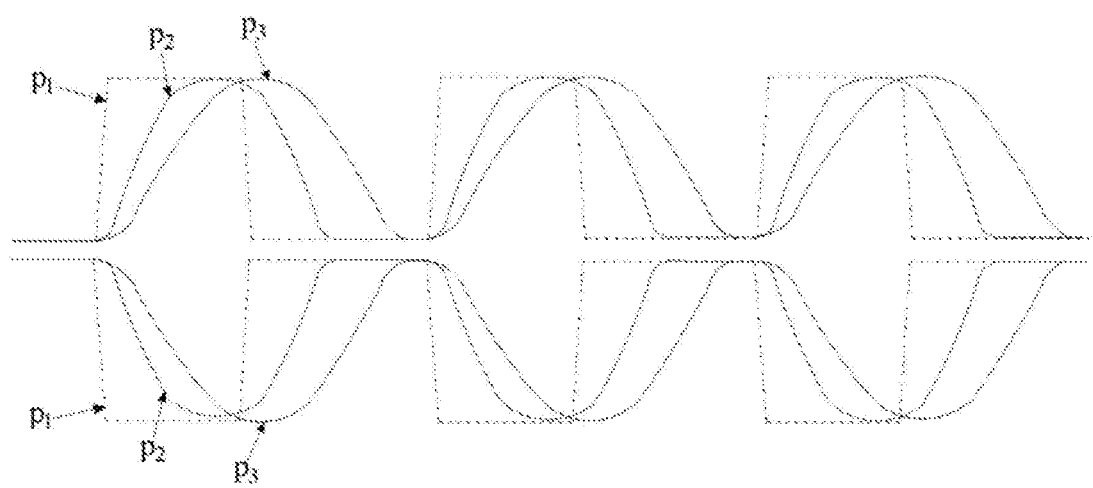
FIG. 11 is a waveform diagram of positive and negative data signals of an Oxide panel.
Figure 12:
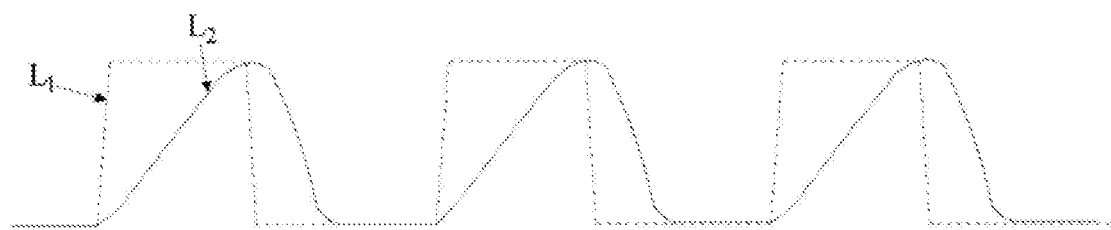
FIG. 12 is a waveform diagram of a gate signal of an Oxide panel.

FIG. 11 specifically shows a simulation waveform diagram of positive and negative data signals of an Oxide panel. In the figure, the upper half of the curves are voltage waveforms of the positive data signals, the lower half of the curves are the voltage waveforms of the negative data signals, p1 represents the data signal waveform of the data line close to the source driver, and p2 and p3 respectively represent the data signal waveforms of two data lines in different columns away from the source driver. It can be seen that the signal of the data line close to the source driver is approximately a square wave, and the signal of the data line far away from the source driver has been distorted and changed into an approximately sinusoidal waveform, and the further away from the source driver, the more severe the distortion of the data signal waveform is. FIG. 12 specifically shows a waveform of the gate signal of the Oxide panel, in which the curve $L_1$ represents the signal of the gate line close to the gate driver, and the curve $L_2$ represents the signal of gate line far from the gate driver. It can be seen that the gate signal waveform may also be distorted and changed into an arc-shaped wave during transmission. During turning off of TFT, since the gate signal is attenuated, a voltage change thereof is of a gradually decreasing curve.

The TFT is turned off when a difference between the gate signal voltage Vg and the data signal voltage Vs is less than Vth, that is, Vg−Vs<Vth, otherwise the TFT is turned on. Since Vth is usually about 0~1V, for convenience of description, the following takes Vth as 0V as an example for description. When Vth=0V, that is, the TFT corresponding to the data signal is turned off when the gate signal voltage Vg decreases to be less than the data signal voltage Vs.

Figure 13:
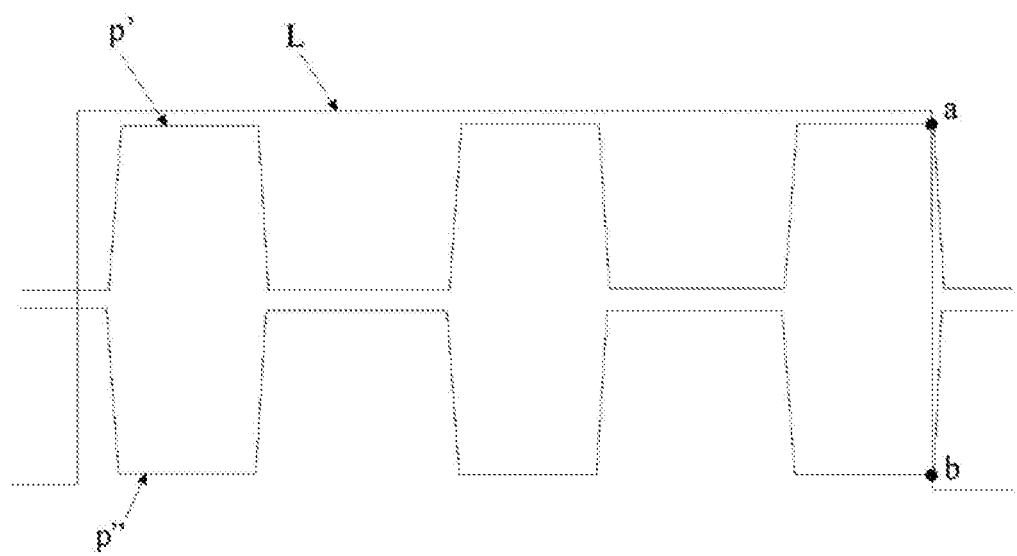
FIG. 13 is a waveform diagram of an ideal data signal and a gate signal close to a gate driver.

Taking an ideal square wave data signal shown in FIG. 13 as an example, the gate signal L drops vertically or nearly vertically near the gate driver, and the gate signal voltage Vg should decrease to the positive data signal voltage Vs and the negative data signal voltage Vs at the same time. That is, the TFT corresponding to the positive data signal will be turned off at the intersection point a of the gate signal L and the positive data signal P' in the figure, the TFT corresponding to the negative data signal will be turned off at the intersection point b of the gate signal L and the negative data signal P'' in the figure, and the points a and b correspond to the same time point. That is, the TFTs corresponding to the positive data signal and the negative data signal are turned off at the same time.

Figure 14:
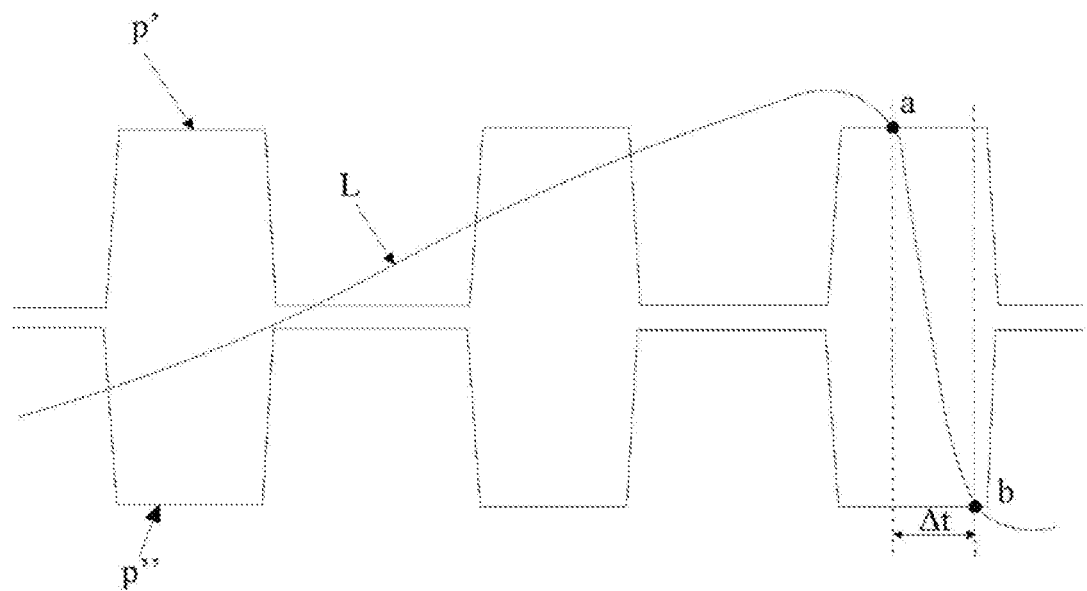
FIG. 14 is a waveform diagram of an ideal data signal and a gate signal far away from a gate driver.

However, since the gate signal far away from the gate driver is attenuated, the TFTs corresponding to the positive data signal and the negative data signal are not turned off at the same time at a position far away from the gate driver. As shown in FIG. 14, at a position away from the gate driver, the gate signal L has a slope due to attenuation. At this time, the gate signal L first decreases to an intersection point a of the gate signal L and the positive data signal P', and the TFT correspond to the positive data signal is turned off; then the gate signal L decreases to an intersection point b of the gate line L and the negative data signal P''', and the TFT corresponding to the negative data signal is turned off. As can be seen from the figure that, the time corresponding to the point a is earlier than the time corresponding to the point b, that is, the TFT corresponding to the positive data signal is turned off earlier than the TFT corresponding to the negative data signal.

Figure 15:
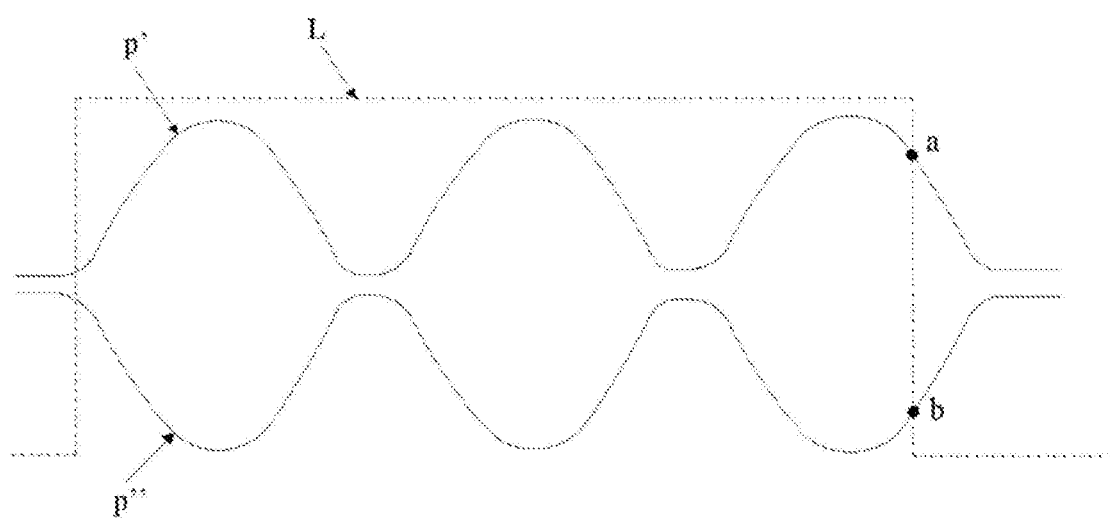
FIG. 15 is a waveform diagram of an attenuated data signal and a gate signal close to a gate driver.

Similarly, taking a distorted data signal shown in FIG. 15 as an example, the gate signal drops vertically or nearly vertically near the gate driver, and at this time, the gate signal voltage Vg should be reduced to be less than the Vs corresponding to the positive data signal and the Vs corresponding to the negative data signal at the same time. That is, the TFTs corresponding to the positive data signal and the negative data signal are turned off at the same time. That is, the TFT corresponding to the positive data signal will be turned off at an intersection point a of the gate signal L and the positive data signal P' in the figure, the TFT corresponding to the negative data signal will be turned off at an intersection point b of the gate signal L and the negative data signal P''', and the points a and b correspond to the same time point.

Figure 16:
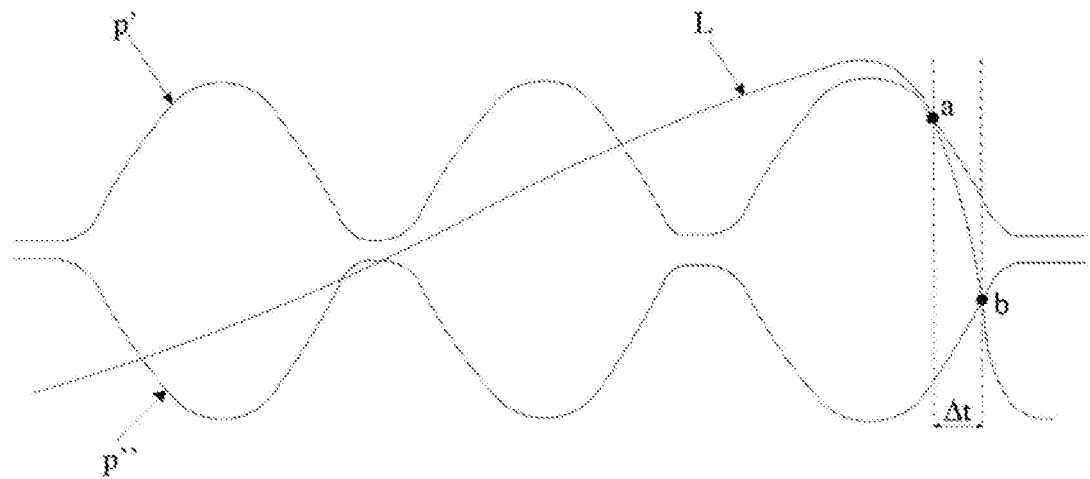
FIG. 16 is a waveform diagram of an attenuated data signal and a gate signal far away from a gate driver.

For the distorted data signal, the TFTs corresponding to the positive data signal and the negative data signal are not turned off at the same time at a position away from the gate driver. As shown in FIG. 16, at a position away from the gate driver, the gate signal L has a slope due to attenuation. At this time, the gate signal L first decreases to an intersection point a of the gate signal L and the positive data signal P', and the TFT correspond to the positive data signal is turned off; then the gate signal L decreases to an intersection point b of the gate line L and the negative data signal P''', and the TFT corresponding to the negative data signal is turned off. The time corresponding to the point a is earlier than the time corresponding to the point b, that is, the TFT corresponding to the positive data signal is turned off earlier than the TFT corresponding to the negative data signal.

It can be seen that the TFT corresponding to the positive data is turned off earlier than the TFT corresponding to the negative data due to the attenuation of the gate signal.

It should be noted that the above examples are all described in the case where Vth is 0V. When Vth is not 0V, for example, when Vth is 1V, it means that when Vg−Vs<1V, the TFT will be turned off That is, when the gate signal voltage decreases to be slightly greater than the data signal voltage, the TFT will be turned off. Referring to the waveforms in FIGS. 13-16, the TFT corresponding to the positive data signal is turned off before the intersection point a of the gate signal L and the positive data signal P', and the TFT corresponding to the negative data signal is also turned off before the intersection point b of the gate signal L and the negative data signal P'''. However, the turning-off time of the TFT corresponding to the positive data is still earlier than the turning-off time of the TFT corresponding to the negative data. Details thereof are not repeated herein.

A simulation experiment on an Oxide panel shows that at the position far away from the source driver shown in FIG. 16, the turning-off time of the TFT corresponding to the positive data signal is at about 1.8 µs, he turning-off time of the TFT corresponding to the negative data signal is at about 2.2 µs, and a time difference Δt therebetween is about 0.4 µs.

Similarly, other display panels, such as a-Si display panels, have the same problem, that is, the TFT corresponding to the positive data signal is turned off earlier than the TFT corresponding to the negative data signal. A simulation experiment was conducted on a-Si display panel, in which at a position far away from the source driver, the turning-off time of the TFT corresponding to the positive data signal is at about 1.8 µs, the turning-off time of the TFT corresponding to the negative data signal is at about 2.5 µs, and a time difference Δt therebetween is about 0.7 µs.

Since the TFT corresponding to the positive data is turned off earlier than the TFT corresponding to the negative data, the charging time of the negative data signal is longer than that of the positive data signal, thereby causing a non-uniform pixel display effect. Especially for a high-frequency display technology, the charging time is extremely valuable. The difference in the charging time from 0.4 µs to 0.7 µs will greatly reduce the charging efficiency of pixels and affect high-frequency display effect.

As for an inversion mode of liquid crystal molecules of a liquid crystal display panel, in a column inversion mode, the charging time of a pixel column receiving the positive data signal is short, and the charging time of the pixel column receiving the negative data signal is long. When scanning of pixels in a previous row is finished and then the scanning of the pixels in a next row starts, there may be a problem that the pixels corresponding to the positive data in the previous row have been turned off while the pixels corresponding to the negative data in the previous row have not been turned off, so that the pixel display here is abnormal. In a frame inversion mode, for the same pixel, the charging time of the positive data signal in a previous frame is short, and the charging time of the negative data signal in a next frame is long, which may also cause abnormal display and affect the display effect.

In view of the above problems, the driving method of the display device is further improved according to an embodiment of the present disclosure. That is, in this method, the inputting data signal to each of the data lines also includes: inputting a positive data signal or a negative data signal to the data line.

Relative to the start time at which the first data line closest to the signal input terminal of the gate line is input with the data signal, the start time at which the $m^{th}$ data line is input with the negative data signal is delayed by the second duration, and the start time at which an $s^{th}$ data line is input with the positive data signal is delayed by a third duration. The second duration and the third duration are both less than the first duration, the second duration is greater than the third duration, and a difference between the second duration and the third duration is less than an effective level duration within one data signal period. The m and s are both positive integers greater than or equal to 2, and m and s are both less than or equal to M.

Specifically in the present application, the duration that the start time of the negative data signal is delayed is longer than the duration that the start time of the positive data signal is delayed. That is, relative to the positive data signal, the negative data signal is delayed to be input to the data line. Therefore, the charging time of the negative data is shortened, so that the charging times of the positive and negative data signals may be maintained the same, and thus the charging time difference may be reduced.

It should be noted that both the second duration and the third duration represent a time period. The third duration may be equal to 0 or greater than 0. Since the second duration is greater than the third duration, the second duration is necessarily greater than 0. That is, there are two cases. The first case is that the start time of the positive data signal is not delayed (i.e., the third duration=0), and only the start time of the negative data signal is delayed (i.e., the second duration>0). The second case is that the start times of the positive data signal and the negative data signal are both delayed (i.e., the third duration>0, and the second duration>0), but the start time of the negative data signal is more delayed than the start time of the positive data signal (the second duration>the third duration). As an example, the first case will be described below in detail.

Figure 17:
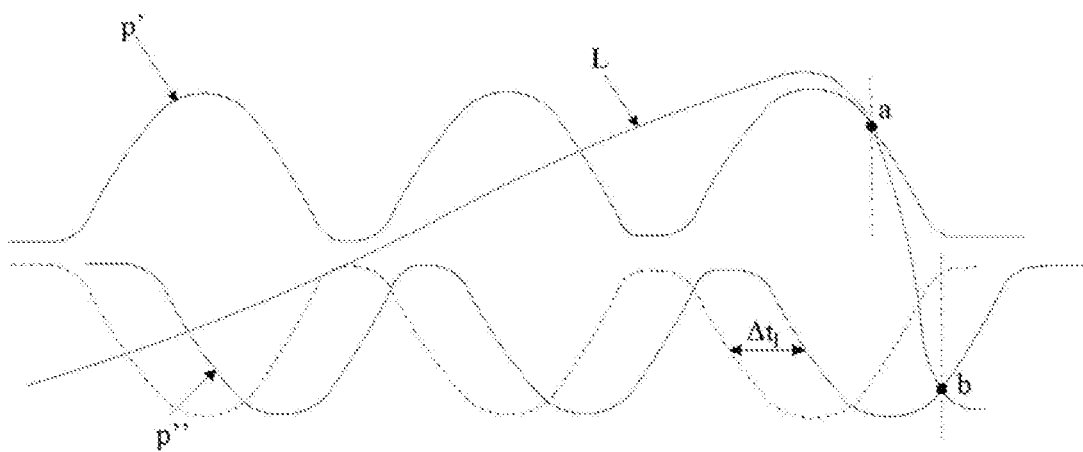
FIG. 17 is a waveform diagram of an attenuated data signal and a gate signal far away from a gate driver in a driving method of a display device according to an embodiment of the present disclosure.

By taking an attenuated data signal as an example, FIG. 17 shows a waveform diagram in which the start time of the negative data signal is delayed relative to the start time of the positive data signal. In the figure, the upper curve P' is the positive data signal, the lower curve P'' is the negative data signal, and the arc-shaped curve L is the gate signal away from the gate driving circuit. It can be seen from the figure that when the start time of the input of the positive data signal is not changed, and the negative data signal is shifted to the right by a duration of $\Delta t_1$ (i.e., the second duration-the third duration=$\Delta t_1$) relative to the positive data signal, the difference in charging times of the positive and negative data signals can be shortened. It should be noted that $\Delta t_1$ needs to be less than an effective level duration within one data period, otherwise the negative data signal would be delayed too much, resulting in that before the negative data signal is input, the TFT has been turned off, and thus the pixel is not charged and there will be an abnormal display.

Further, when $\Delta t_1=\Delta t$, that is, when the time that the negative data signal is delayed relative to the positive data signal is equal to the time difference between the turning-off time of the TFT corresponding to the negative data signal and the turning-off time of the TFT corresponding to the positive data signal (i.e., the aforementioned Δt), the charging duration of the negative data signal and the charging duration of the positive data signal are the same.

Therefore in the embodiment, by controlling the start times of the positive and negative data signals input to the data lines to be different, the charging difference between the positive and negative data due to the difference in the turning-off time of the TFT is eliminated, thereby ensuring an uniform and stable display effect. Especially for the high-frequency display technology in which a scanning time of each pixel row is relatively short, the method greatly improves the charging efficiency of the positive and negative data.

For example, in some examples, when m≠s, the start time at which the $m^{th}$ data line is input with the negative data signal is delayed by the second duration, the start time at which the $s^{th}$ data line is input with the positive data signal is delayed by the third duration, the second duration is greater than the third duration, and the difference between the second duration and the third duration is less than the effective level duration within the one data signal period, which means that the positive data signal and the negative data signal are input to the data lines of different columns respectively. The driving method of the display device may be used to adjust the charging times of two parts of sub-pixels with opposite data polarities. The two parts of sub-pixels may include a first part of sub-pixel and a second part of sub-pixel in different columns. That is, the display driving method may be used for the display driving in the column inversion mode to adjust the charging times of different sub-pixels. In a traditional driving method, at the same time, the data line inputs the positive data signal to the first part of sub-pixel and the negative data signal to the second part of sub-pixel at the same time. When the TFT of the first part of sub-pixel is turned off, the TFT of the second part of sub-pixel has not been turned off completely, resulting in non-uniform charging effects of the two parts of sub-pixels and thus non-uniform display effects. In the embodiment, the input time of inputting the entire negative data signal to the data line may be delayed, so that the charging times of the positive data signal of the first part of sub-pixel and the negative data signal of the second part of sub-pixel are the same, thereby ensuring that the charging effects of the two parts of sub-pixels are the same, so as to ensure the same display effect.

The first part of sub-pixel and the second part of sub-pixel may be alternately arranged in sequence, or the first part of sub-pixel and the second part of sub-pixel may be arranged in separate regions. Regardless of the arranging form of the first and second parts of sub-pixels, when the data polarities between columns are opposite to each other, the driving method may ensure the uniform display effect between the columns with opposite data polarities.

Those skilled in the art may understand that the first part of sub-pixel and the second part of sub-pixel are only used to divide the sub-pixels, and the correspondence between the two parts of sub-pixels and the positive data signal and the negative data signal may also be interchanged, that is, the first part of sub-pixel receives the negative data signal, and the second part of sub-pixel receives the positive data signal.

For example, in some examples, when m=s, it indicates that the same data line is input with the positive data signal and negative data signal successively. That is, the second duration by which the start time at which the $m^{th}$ data line is input with the negative data signal at a first frame is delayed is greater than the third duration by which the start time at which the $s^{th}$ data line is input with the positive data signal at a second frame is delayed, and the difference between the second duration and the third duration is less than the effective level duration within the one data signal period. The display driving method may be further used for the display driving in a frame inversion mode. Specifically, the source driver inputs the positive data signal to the data line at the first frame, and inputs the negative data signal to the data line at the second frame. In a conventional frame inversion driving method, because the data polarities of the first frame and the second frame are opposite to each other, the time difference of the turning-off of the TFT would make the charging durations of the same sub-pixel to be different within the two frames, resulting in uneven brightness and poor display effect. In the embodiment, the start time at which the data line is input with the negative data signal at the second frame may be delayed, so that the charging duration of the positive data signal at the first frame is consistent with the charging duration of the negative data signal at the second frame. In this way, the charging effect of the data signal in the two frames is consistent, thereby ensuring the consistent display effect.

Those skilled in the art may understand that the first frame and the second frame are only used to divide the time, and the correspondence between the two frames and the positive data signal and the negative data signal may also be interchanged, that is, the negative data signal is input to the data line at the first frame, and the positive data signal is input to the data line at the second frame.

It should be noted that in the above two implementations of the present disclosure, the negative data signal is delayed overall, that is, the input time of the negative data signal of sub-pixels of an entire column is delayed overall, or the input time of the negative data signal of all sub-pixels of an entire picture is delayed overall.

It should be noted that for different display panels, the gate signals may also have a relative delay to each other, which will affect the Δt. In order to ensure that the Δt within an adjustable range may cover a plurality of panels at the same time, a reserving shift register shall have the adjustable range greater than 1.5 µs.

It should also be noted that the above description is based on the example that the start time of the positive data signal is not delayed, and only the start time of the negative data signal is delayed. Those skilled in the art may understand that when the positive data signal is also delayed (that is, the third duration>0), as long as the start time of the negative data signal is further delayed than the start time of the positive data signal (the second duration>the third duration), the difference in charging time may also be eliminated, which will not be repeated here.

Based on the above display controlling method, in the display device according to an embodiment of the present disclosure, the source driver 300 is configured to input the positive data signal or the negative data signal to each of the data lines to drive the display device for displaying. Relative to the start time at which the first data line closest to the signal input terminal of the gate line is input with the data signal, the start time at which the $m^{th}$ data line is input with the negative data signal is delayed by the second duration, the start time at which the $s^{th}$ data line is input with the positive data signal is delayed by the third duration, the second duration is greater than the third duration, and is less than the effective level duration within one data signal period, where m and s are both positive integers greater than or equal to 2.

For example, in some examples, as shown in FIG. 10, the driver 700 further includes a delay driver 600, configured to enable the source driver 300 so that in the direction of the gate line from the signal input terminal to the one terminal away from the signal input terminal, relative to the start time at which the first data line closest to the signal input terminal is input with the data signal, the start time at which the $m^{th}$ data line is input with the negative data signal is delayed by the second duration, the start time at which the $s^{th}$ data line is input with the positive data signal is delayed by the third duration, the second duration is greater than the third duration, and is less than the effective level duration within the one data signal period.

Figure 18:
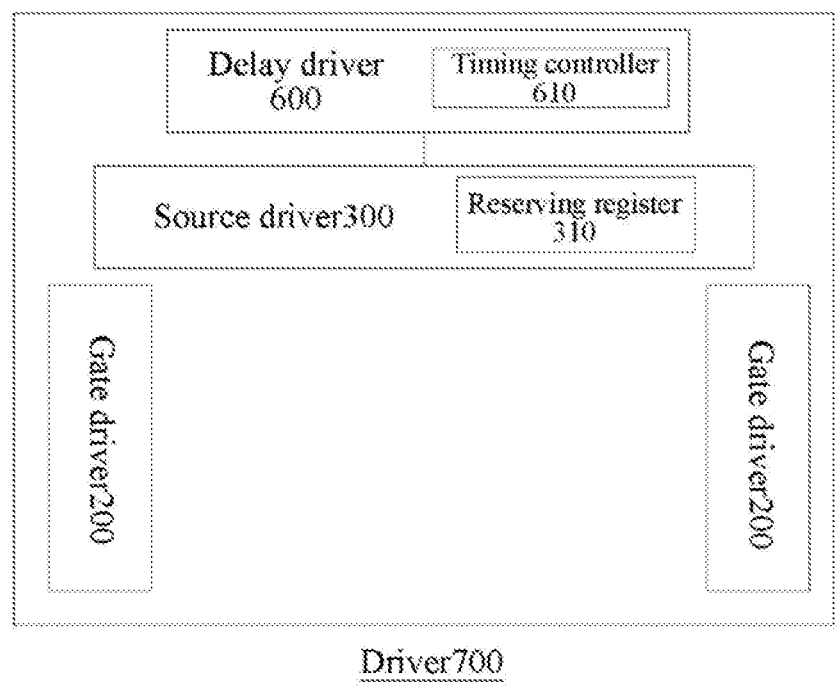
FIG. 18 is a schematic diagram of another driver according to an embodiment of the present disclosure.

For example, in some examples, as shown in FIG. 18, the delay driver 600 includes a timing controller 610 configured to output a data transmission control signal. The source driver 300 further includes a reserving register 300, and the reserving register 300 is configured to control the start time of the positive data signal or the negative data signal in response to the data transmission control signal, so that the start time at which the $m^{th}$ data line is input with the negative data signal is delayed by the second duration, the start time at which the $s^{th}$ data line is input with the positive data signal is delayed by the third duration, the second duration is greater than the third duration, and is less than the effective level duration within the one data signal period.

Specifically, in a TFT driving circuit, the timing controller 610 is used to output the data transmission control signal providing a timing of the data signal to the source driver 300, and the source driver 300 delays, in response to the data transmission control signal, the start time at which the data line is input with the data signal, so that the data signal is input to the data line according to a preset timing. By modifying the input time of the negative data or positive data in the timing controller, and further providing a corresponding register for latching and delaying the data, the delay of the data signal may be realized.

In order to reduce an amount of resources consumed, the reserving register 310 provided in the source driver may be used to adjust the data signal. Specifically, the source driver usually is provided with a part of the reserving register 310 for expanding under certain circumstances. In an embodiment, the shift register reserved in the source driver 300 may be used to delay or advance data. The shift register may sequentially shift a registered data to the left or right under a clock signal, thereby achieving signal delay or advance.

For example, in some examples, the reserving register 310 is an eight-bit shift register. For example, under a bandwidth of 4 Gbps, each byte will have a change of 2 package (5 ns), so that the charging time difference $\Delta t$ of the positive and negative data may be adjusted by the eight-bit shift register in a range of 1.2 µs. which may meet the adjustment requirements of the a-Si display panel and the Oxide display panel. It may realize the signal adjustment without providing a separate register. In this way, a setting is completed only by occupying the internal 1-byte reserving register without providing new functional IP, which consumes fewer resources and reduces design costs.

It should be noted that the source driver 300 may further include a shift register circuit, a latch circuit, a D/A conversion circuit, and a gamma correction circuit, etc., for outputting the data signal, which will not be repeated here.

In the examples of the present disclosure, the display device may be a device using an amorphous silicon liquid crystal display panel or a metal oxide liquid crystal display panel. The positive and negative charging effects of the two display panels are inconsistent obviously, and as mentioned above, the time difference $\Delta t$ is between 0.4 and 0.7 µs. In such case, the above display device may achieve a more ideal display effect. In other embodiments, the display device may also use other liquid crystal panels, such as a low-temperature polycrystalline silicon (p-Si) display panel, a monocrystalline silicon (c-Si) display panel, etc. As long as there is a problem that the charging time is inconsistent due to a difference in turning-off time of the positive and negative data signals, the driving method of the present disclosure may be used, which will not be described in detail here.

The present disclosure does not specifically limit the application of the display device. The display device may be used for any product or component with a display function, such as a mobile phone, tablet computer, television, notebook computer, digital photo frame, and navigator.

It should be noted that:

(1) in the drawings of the embodiments of the present disclosure, only the structures related to the embodiments of the present disclosure are involved, and other structures may refer to the general design; and (2) the features in the same embodiment and different embodiments of the present disclosure may be combined with each other without conflicting.

The above are only specific implementations of the present disclosure, but the protection scope of the present disclosure is not limited thereto, and any person skilled in the art may readily conceive of changes or replacements within the technical scope disclosed in the present disclosure, which should fall within the protection scope of the present disclosure. Therefore, the protection scope of the present disclosure shall be subject to the protection scope of the claims.

What is claimed is:

1. A driving method of a display device, comprising:
   providing the display device, wherein the display device comprises a plurality of gate lines and a plurality of data lines crossing each other, and each of the gate lines comprises a signal input terminal;
   inputting a gate signal with a length of a first duration to each of the gate lines; and
   inputting a data signal to each of the data lines to drive the display device for displaying, wherein:
   among M data lines crossing the gate line in a direction of the gate line away from the signal input terminal, a start time at which an mth data line is input with the data signal is delayed by a second duration, relative to the start time at which a first data line closest to the signal input terminal of the gate line is input with the data signal;
   the second duration is less than the first duration, where M and m are both positive integers greater than or equal to 2, and m is less than or equal to M;
   the plurality of data lines comprise N data line groups;
   in each of the data line groups, the start time at which each of the data lines is input with the data signal is the same;
   in a direction of the gate line from the signal input terminal to one terminal away from the signal input terminal, the second durations of the N data line groups are increased gradually as distances from the N date line groups to the signal input terminal are increased, where N is a positive integer greater than or equal to 1; and
   the driving method further comprises: determining an overall delay time $T_{CLK}$ of each of the gate lines; and dividing the overall delay time into N parts equally, wherein the second time of an $n^{th}$ data line group of the N data line groups is $y=(n-1) \times T_{CLK}/N$, where n is a positive integer, and $1 \leq n \leq N$.

2. The driving method of the display device according to claim 1, wherein the overall delay time $T_{CLK}$ of each of the gate lines satisfies the following formula:

$$T_{CLK} = (2^j \times T_j \times 2^{j-1} \times T_{j-1} + \ldots + 2^2 \times T_2 \times 2^1 \times T_1 + 2^0 \times T_0 \times k) \times 2t,$$

where t is a signal clock period, k is a correction base, $T_0$, $T_1$, $T_2 \ldots T_j$ have a value range of 1 or 0, j has a value range of 4-8, and k has a value range of 0-10.

3. The driving method of the display device according to claim 2, wherein j has a value of 4, 6, or 8.

4. The driving method of the display device according to claim 1, wherein the display device includes N source drivers configured to apply the data signals to the plurality of data lines, and the driving method comprises: driving the N data line groups by using the N source drivers, respectively.

5. The driving method of the display device according to claim 1, wherein:
the plurality of gate lines comprises a plurality of first gate lines and a plurality of second gate lines;
the plurality of first gate lines are arranged to correspond to the plurality of second gate lines one by one;
the signal input terminal of the first gate line is located at a first edge of the display device;
the signal input terminal of the second gate line is located at a second edge, opposite to the first edge, of the display device; and
the first gate line and the second gate line arranged correspondingly are configured to be applied with the gate signals of a same timing.

6. The driving method of the display device according to claim 5, wherein the first gate line and the second gate line arranged correspondingly are coupled with each other.

7. The driving method of the display device according to claim 1, wherein:
the display device further comprises a plurality of pixel units defined by intersections of the plurality of gate lines and the plurality of data lines, and each of the pixel units comprises a thin film transistor; and
a gate of the thin film transistor is coupled to the gate line, and a source of the thin film transistor is coupled to the data line.

8. The driving method of the display device according to claim 1, wherein the gate signal is a first pulse signal, and the data signal is a second pulse signal.

9. The driving method of the display device according to claim 1, wherein inputting the data signal to each of the data lines further comprises: inputting a positive data signal or a negative data signal to the data line, wherein:
relative to the start time at which the first data line closest to the signal input terminal of the gate line is input with the data signal, the start time at which the mth data line is input with the negative data signal is delayed by the second duration, and the start time at which an sth data line is input with the positive data signal is delayed by a third duration;
the second duration and the third duration are both less than the first duration, the second duration is greater than the third duration, and a difference between the second duration and the third duration is less than an effective level duration within one data signal period; and
m and s are both positive integers greater than or equal to 2, and m and s are both less than or equal to M.

10. The driving method of the display device according to claim 9, wherein the difference between the second duration and the third duration is Δt, and Δt is equal to a time difference between an off-time of a switching element corresponding to the negative data signal and the off-time of the switching element corresponding to the positive data signal.

11. The driving method of the display device according to claim 9, wherein m=s, the start time at which the mth data line is input with the negative data signal is delayed by the second duration, the start time at which the sth data line is input with the positive data signal is delayed by the third duration, the second duration is greater than the third duration, and the difference between the second duration and the third duration is less than the effective level duration within the one data signal period.

12. The driving method of the display device according to claim 9, wherein m=s, the second duration by which the start time at which the mth data line is input with the negative data signal at a first frame is delayed is greater than the third duration by which the start time at which the sth data line is input with the positive data signal at a second frame is delayed, and the difference between the second duration and the third duration is less than the effective level duration within the one data signal period.

13. A display device, comprising:
a plurality of gate lines and a plurality of data lines crossing each other, and each of the gate lines comprising a signal input terminal; and
a driver configured to drive the display device for displaying, wherein the driver comprises: at least one gate driver configured to input a gate signal with a length of a first duration to each of the gate lines; and at least one source driver configured to input a data signal to each of the data lines to drive the display device for displaying, wherein:
among M data lines crossing the gate line in a direction of the gate line from the signal input terminal to one terminal away from the signal input terminal, a start time at which an mth data line is input with the data signal is delayed by a second duration, relative to the start time at which a first data line closest to the signal input terminal of the gate line is input with the data signal;
the second duration is less than the first duration, where M and m are both positive integers greater than or equal to 2, and m is less than or equal to M;
the plurality of data lines comprise N data line groups, the at least one source driver comprises N source drivers configured to apply the data signals to the plurality of data lines, and the N source drivers are configured to respectively drive the N data line groups, so that in the direction of the gate line from the signal input terminal to the one terminal away from the signal input terminal, the second durations of the N data line groups are increased gradually as distances from the N date line groups to the signal input terminal are increased; and
the N source drivers are further configured to: determine an overall delay time $T_{CLK}$ of each of the gate lines; and divide the overall delay time into N parts equally, wherein the second time of an $n^{th}$ data line group of the N data line groups is $y=(n-1)\times T_{CLK}/N$, where n is a positive integer, and $1 \leq n \leq N$.

14. The display device according to claim 13, wherein the driver further comprises:
a delay driver configured to enable the source driver so that among the M data lines crossing the gate line in the direction of the gate line from the signal input terminal to the one terminal away from the signal input terminal, the start time at which the mth data line is input with the data signal is delayed by the second duration, relative to the start time at which the first data line closest to the signal input terminal is input with the data signal, and
wherein the second duration is less than the first duration, where M and m are both the positive integers greater than or equal to 2, and m is less than or equal to M.

15. The display device according to claim 13, wherein:
the source driver is configured to input a positive data signal or a negative data signal to the data line;
relative to the start time at which the first data line closest to the signal input terminal of the gate line is input with the data signal, the start time at which the mth data line is input with the negative data signal is delayed by the second duration, and the start time at which an sth data line is input with the positive data signal is delayed by a third duration;

the second duration and the third duration are both less than the first duration, the second duration is greater than the third duration, and a difference between the second duration and the third duration is less than an effective level duration within one data signal period; and m and s are both positive integers greater than or equal to 2.

16. The display device according to claim 15, wherein the driver further comprises:

a delay driver configured to enable the source driver so that in the direction of the gate line from the signal input terminal to the one terminal away from the signal input terminal, relative to the start time at which the first data line closest to the signal input terminal is input with the data signal, the start time at which the mth data line is input with the negative data signal is delayed by the second duration, and the start time at which the sth data line is input with the positive data signal is delayed by the third duration; and wherein the second duration is greater than the third duration, and the difference between the second duration and the third duration is less than the effective level duration within the one data signal period.

17. The display device according to claim 16, wherein:

the delay driver comprises a timing controller configured to output a data transmission control signal;

the source driver further comprises a reserving register, and the reserving register is configured to control the start time of the positive data signal or the negative data signal in response to the data transmission control signal, so that the start time at which the mth data line is input with the negative data signal is delayed by the second duration, and the start time at which the sth data line is input with the positive data signal is delayed by the third duration; and the second duration is greater than the third duration, and the difference between the second duration and the third duration is less than the effective level duration within the one data signal period.

* * * * *